(12) United States Patent
Sarkar et al.

(10) Patent No.: US 8,369,853 B1
(45) Date of Patent: Feb. 5, 2013

(54) ENHANCED SIMULTANEOUS HYBRID DUAL RECEIVE SWITCHING

(75) Inventors: Debasish Sarkar, Irvine, CA (US); Sachin R. Vargantwar, Overland Park, KS (US); Siddharth S. Oroskar, Overland Park, KS (US); Deveshkumar Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 657 days.

(21) Appl. No.: 12/368,323

(22) Filed: Feb. 10, 2009

(51) Int. Cl.
*H04W 36/00* (2009.01)
*H04L 12/66* (2006.01)

(52) U.S. Cl. ........................ 455/436; 370/352

(58) Field of Classification Search ............. 370/352, 370/331, 252; 455/137
See application file for complete search history.

(56) References Cited

U.S. PATENT DOCUMENTS

| | | | |
|---|---|---|---|
| 6,285,861 B1 * | 9/2001 | Bonaccorso et al. | 455/137 |
| 6,738,373 B2 * | 5/2004 | Turner | 370/352 |
| 6,804,532 B1 | 10/2004 | Moon et al. | |
| 7,821,988 B1 | 10/2010 | Gunasekara et al. | |
| 7,916,715 B2 * | 3/2011 | Rezaiifar et al. | 370/352 |
| 7,933,602 B1 | 4/2011 | Balakrishnan et al. | |
| 2003/0087680 A1 | 5/2003 | Kim | |
| 2006/0209801 A1 | 9/2006 | Joshi et al. | |
| 2007/0129020 A1 | 6/2007 | Anton-Becker | |
| 2008/0013488 A1 * | 1/2008 | Garg et al. | 370/331 |
| 2008/0117876 A1 * | 5/2008 | Hidaka et al. | 370/331 |
| 2009/0137267 A1 | 5/2009 | Nader et al. | |
| 2011/0176448 A1 * | 7/2011 | Rezaiifar et al. | 370/252 |

OTHER PUBLICATIONS

Unpublished U.S. Appl. No. 12/248,943, entitled "Simultaneous Hybrid Dual Receive Switching Algorithm and Implementation" filed Oct. 10, 2008 in the name of Dabasish Sarkar et al.
Office Action in U.S. Appl. No. 12/248,943 mailed Jun. 27, 2011.
Office Action in U.S. Appl. No. 12/248,943 mailed Feb. 29, 2012.

* cited by examiner

*Primary Examiner* — Ariel Balaoing
*Assistant Examiner* — Yungsang Lau

(57) ABSTRACT

A method and system is disclosed for enhanced idle-state sector selection during hybrid-mode operation of an access terminal. A hybrid access terminal engaged in an IS-856 data communication session in a hybrid IS-2000/IS-856 wireless communication system will, responsive to a handoff of the IS-856 session, select a sector for its next, upcoming IS-2000 idle-state scan prior to the start of the scan. The selection will be made during an interval between IS-2000 idle-state scans, thereby reducing or eliminating the possible need for idle-state handoffs during idle-state scans, and resulting in shorter idle-state scans and better IS-856 performance.

24 Claims, 7 Drawing Sheets

ENHANCED SIMULTANEOUS HYBRID DUAL RECEIVE SWITCHING

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

SUMMARY

When a hybrid access terminal operating in a hybrid wireless communication system, such as a hybrid IS-2000/IS-856 system, is engaged in an active IS-856 data communication session, the AT is in an "idle state" with respect to IS-2000 communications. In the IS-2000 idle state, the hybrid AT will periodically scan the IS-2000 air interface for IS-2000 communications. More specifically, the hybrid AT will scan an IS-2000 paging channel (as well as other IS-2000 control channels) for any page messages or other IS-2000 alerts or messages. Because the IS-2000 interface and the IS-856 interface use different RF frequencies, the hybrid AT must tune to the IS-2000 interface (and away from the IS-856 interface) in order to conduct the scan. Such "tuneaway scans" can interrupt the ongoing IS-856 communication session, thereby reducing data throughput. A tuneaway scan usually has a nominal duration of about 80 milliseconds, although other durations are possible.

In order to help reduce the impact of tuneaway scans, newer-generation hybrid ATs have two antennas—a high-gain (primary) antenna and a low-gain (secondary antenna)—that may be simultaneously tuned to the same or different RF frequencies, thus facilitating so-called "Simultaneous Hybrid Dual Receive" ("SHDR") mode or operation. A SHDR-capable access terminal will tune both antennas to the IS-856 air interface to engage in an IS-856 communication session, and use just the low-gain antenna for periodic tuneaway scans on the IS-2000 interface. The IS-856 communication session remains continuous, even during tuneaway scans, albeit at a somewhat reduced sensitivity. However, if the signal received by the AT on the IS-2000 interface is too weak to be reliably detected by the low-gain antenna (e.g., owing to the AT's location in the serving sector), then the AT will revert to "legacy hybrid mode," in which both antennas tune away to the IS-2000 air interface during the periodic tuneaway scans. In this mode of operation, the IS-856 communication is again interrupted during IS-2000 scans.

A hybrid AT with an active IS-856 communication session may hand off from one sector (or other form of coverage area) to another as it moves about within and among sectors. Since a handoff is generally related to changing RF conditions, handoff of the IS-856 session could indicate that a handoff between IS-2000 sectors is necessary and/or appropriate as well. However, an AT in the IS-2000 idle state will not recognize that an "idle-state handoff" is necessary until the start of the next tuneaway scan. Then, if the handoff is needed, the resultant duration of the tuneaway scan will be increased over the nominal duration, in order to accommodate the handoff procedure. Moreover, the conditions that trigger an idle-state handoff could also cause the AT to revert to legacy hybrid mode.

Accordingly, embodiments of the present invention provide a method and system for determining a wireless coverage area to use for an upcoming idle-state scan prior to the start of the scan. More particularly, a method and system is disclosed for "enhanced idle-state sector selection during hybrid-mode" operation of an access terminal. A hybrid access terminal engaged in an IS-856 data communication session in a hybrid IS-2000/IS-856 wireless communication system will, responsive to a handoff of the IS-856 session, select a sector for its next, upcoming IS-2000 idle-state scan prior to the start of the scan. The selection will be made during an interval between IS-2000 idle-state scans, thereby reducing or eliminating the possible need for idle-state handoffs during idle-state scans, and resulting in shorter idle-state scans and better IS-856 performance.

Hence, in one respect, various embodiments of the present invention provide, in an access terminal operating in a wireless communication system, and having at least a first air interface that operates according to a first air interface protocol and a second air interface that operates according to a second air interface protocol, a method comprising: engaging in a communication session on the first air interface via one or more wireless access areas that are among a first plurality of wireless access areas, including a first wireless access area and a second wireless access area; during the communication session, engaging in periodic intervals of scanning on the second air interface for communication from one or more wireless access areas that are among a second plurality of wireless access areas; making a determination of whether the second plurality of wireless access areas is the same as the first plurality of wireless access areas; in a time interval between a previous periodic interval and a next periodic interval, responsive to an occurrence during the time interval of a handoff of the communication session from the first wireless access area to the second wireless access area, choosing a particular wireless access area by (i) if the determination is that the second plurality of wireless access areas is the same as the first plurality of wireless access areas, selecting the second wireless access area as the particular wireless access area, and (ii) if the determination is that the second plurality of wireless access areas is not the same as the first plurality of wireless access areas, selecting the particular wireless access area based on a respective signal strength detected on the second air interface from each of one or more of the second plurality of wireless access areas; and in the next periodic interval, scanning on the second air interface for communication from the particular wireless access area.

In another respect, various embodiments of the present invention provide, in an access terminal operating in a wireless communication system, and having at least a first air interface that operates according to a first air interface protocol and a second air interface that operates according to a second air interface protocol, a method comprising: engaging in a communication session on the first air interface via one or more wireless access areas that are among a plurality of wireless access areas, including a first wireless access area and a second wireless access area; during the communication session, engaging in periodic intervals of scanning on the second air interface for communication from one or more wireless access areas that are also among the plurality of wireless access areas; in a time interval between a previous periodic interval and a next periodic interval, responsive to an occurrence during the time interval of a handoff of the communication session from the first wireless access area to the second wireless access area, selecting a particular wireless access area based on a respective signal strength detected on the second air interface from each of one or more of the plurality of wireless access areas; and in the next periodic interval, scanning on the second air interface for communication from the particular wireless access area.

In still another respect, various embodiments of the present invention provide, in an access terminal operating in a wireless communication system, and having at least a first air interface that operates according to a first air interface protocol and a second air interface that operates according to a second air interface protocol, an improvement comprising: means for engaging in a communication session on the first air interface via one or more wireless access areas that are among a plurality of wireless access areas, including a first wireless access area and a second wireless access area; means for engaging, during the communication session, in periodic intervals of scanning on the second air interface for communication from one or more wireless access areas that are also among the plurality of wireless access areas; means for selecting, in a time interval between a previous periodic interval and a next periodic interval, and responsive to an occurrence during the time interval of a handoff of the communication session from the first wireless access area to the second wireless access area, a particular wireless access area based on a respective signal strength detected on the second air interface from each of one or more of the plurality of wireless access areas; and means for scanning, in the next periodic interval, on the second air interface for communication from the particular wireless access area.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
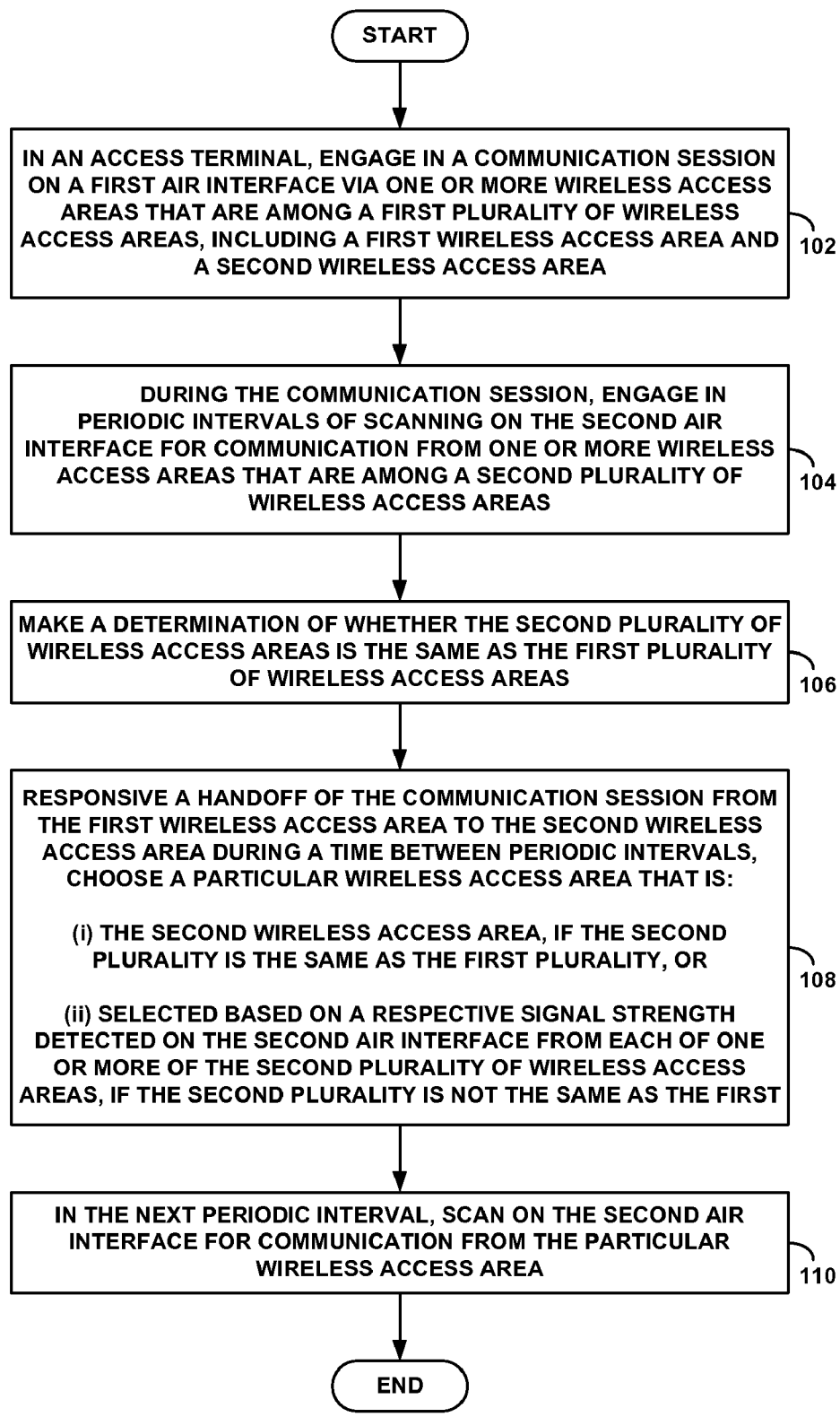
FIG. 1 is a flowchart depicting an example embodiment of enhanced idle-state sector selection during hybrid-mode operation.

FIG. 1 is a flowchart depicting an example embodiment of enhanced idle-state sector selection during hybrid-mode operation of an access terminal in a hybrid wireless communication system. By way of example, the steps of the flowchart could be implemented in an access terminal capable of communicating on a first air interface according to a first air interface protocol and on a second air interface according to second air interface protocol. Such an access terminal is referred to as a "hybrid" access terminal. In accordance with the example embodiment, the first air interface protocol could be IS-856 and the second could be IS-2000. Further, a hybrid access terminal could have two antennas, each of which may be employed separately on each interface to support simultaneous communications on both interfaces, or both of which may be employed in combination on one or the other interface at any one time. In practice, one antenna usually has higher gain than the other, and is referred to either as the "high-gain" or "primary" antenna. The other, lower gain antenna is referred to either as the "low-gain" or "secondary" antenna.

At step 102, a hybrid access terminal engages in a communication session on the first air interface via one or more wireless access areas that are among a first plurality of wireless access areas. In accordance with the example embodiment, the first air interface protocol is IS-856, and as such the communication session could be an EVDO data session or other EVDO-based communication session. In further accordance with the example embodiment, the hybrid access terminal could have both a high-gain antenna and a low-gain antenna, and could engage in the EVDO data session using both antennas in combination. Each wireless access area could be a cell or a sector served by a BTS or base station, for instance, and the first plurality could then be a plurality of cells and/or sectors served by a one or more BTSs or base stations. For purposes of the discussion herein, the first plurality of wireless access areas is considered to include at least a "first" wireless access area and a "second" wireless access area.

At step 104, during the EVDO communication session, the hybrid AT engages in periodic intervals of scanning for communication on the second air interface from one or more access areas that are among a second plurality of wireless access areas. In accordance with the example embodiment, the second air interface protocol could be IS-2000, whereby the AT could be scanning for a 1X-RTT communication. More specifically, while the AT is engaged in an EVDO session on its IS-856 interface, it is in an idle state with respect to 1X-RTT communications. However, as explained in further detail below, during 1X-RTT idle-state operation, the AT periodically scans for communication on its IS-2000 interface. In particular, the AT scans for a 1X-based page messages on a 1X paging channel, or a message on another 1X control channel. For a hybrid AT with two antennas, scanning the 1X interface could involve the AT tuning one or another of its antennas to the 1X interface and away from the EVDO interface. More particularly, in a mode of operation conventionally referred to as "Simultaneous Hybrid Dual Receive" ("SHDR") mode, the AT uses its high-gain antenna to maintain the EVDO communication session on the IS-856 interface while using its low-gain antenna to scan the IS-2000 interface for a 1X-RTT idle-state communication.

As in step 102, each wireless access area of step 104 could be a cell or a sector served by a BTS or base station, and the second plurality could again be a plurality of cells and/or sectors served by a one or more BTSs or base stations. Note that the terms "first" and "second" as applied herein to wireless access areas or pluralities of wireless access areas are identifying labels, and not meant to imply any numerical ordering (although a numerical ordering is not necessarily excluded).

At step 106, a determination is made as to whether the second plurality of wireless access areas is the same as the first plurality of wireless service areas. In practice, some or all sectors (or cells) of the wireless communication system may provide both EVDO and 1X-RTT coverage, referred to herein as "dual-mode" coverage. Sectors that don't provide dual-mode coverage will then provide "single-mode" coverage of one or the other type, though single-mode, EVDO-only sectors are not currently common. Depending on the coverage modes of the wireless access areas and how they are deployed geographically, a given region or sub-region will most typically be characterized either entirely by dual-mode coverage sectors, or by a mix of dual-mode sectors and single-mode, 1X-RTT sectors. For example, a given metropolitan area might be served by a mix of dual-mode sectors and single-mode, 1X-RTT sectors, while a different metropolitan area might be served entirely by only dual-mode sectors. As another example, some sub-regions of the given metropolitan area (e.g., one or more suburbs) might be served by the mix of dual-mode and single-mode sectors, while other sub-regions (e.g., a city center and/or other suburbs) might be served entirely by only dual-mode sectors. It will be appreciated that other arrangements are possible as well.

While not explicitly described above, it is also possible for a region or sub-region to be characterized by a mix of 1X-RTT-only sectors and EVDO-only sectors. However, since single-mode, EVDO-only sectors are currently relatively uncommon, mixed, single-mode arrangements are correspondingly rare, and are not further considered herein. Such arrangements nevertheless remain within the scope and spirit of the present invention.

In a region or sub-region characterized entirely by dual-mode sectors, the first plurality of wireless coverage areas and the second plurality of wireless coverage areas is the same. That is, since each sector provides both EVDO and 1X-RTT coverage, a plurality of sectors that provide EVDO coverage is also a plurality of sectors that provide 1X-RTT coverage. Conversely, in a given region characterized by a mix of dual-mode and single-mode sectors, the first and second pluralities are not the same (provided that the mathematical union of the two pluralities encompasses all of the sectors of the given region). That is, since at least some of the sectors provide only 1X-RTT coverage, the second plurality of sectors cannot be the same as the first plurality sectors, which provide EVDO coverage.

In view of the above description, the determination made at step 106 corresponds to a determination of which type of region the access terminal is operating within. Thus, if the access terminal is operating within a region where all the wireless coverage areas provide dual-mode coverage (i.e., both EVDO and 1X-RTT), then the determination will be that the second plurality of wireless coverage areas is the same as the first plurality of wireless coverage areas. If the access terminal is instead operating within a region served by a mix of dual-mode sectors and single-mode sectors, then the determination will be that the second plurality of wireless coverage areas is not the same as the first plurality of wireless coverage areas.

The access terminal could make the determination of step 106 in a number of ways. For example, if regions or sub-regions of the wireless communication system are relatively statically configured with respect to coverage mode, the access terminal could be provisioned (e.g., in memory) with a list or table that correlates regions (or sub-regions) with coverage mode. Then, with knowledge of the region it is operating in, the AT could determine for itself whether the first and second pluralities of wireless access areas are or are not the same. The provisioned information could be updated from time to time as necessary. As another example, the RAN that is serving the access terminal could provide the relevant information in a message. With this approach, the AT could be updated as it moves from one region (or sub-region) to another. These examples are not meant to be limiting, and it will be appreciated that there could be other methods by which the AT makes the determination of step 106.

Responsive to a handoff of the communication session during a time between periodic scanning intervals, the access terminal chooses a particular wireless access area to use for the next periodic scanning interval, as indicated at step 108. In accordance with the example embodiment, upon occurrence between one periodic 1X-RTT idle-state scanning interval and a next of a handoff of the communication session from the first wireless access area to the second wireless access area, the AT engages in a procedure to determine a wireless access area that should be used during its next idle-state scan. By doing so, the AT does not have to devote time during the next scan interval to search for an appropriate wireless access area before even beginning the scan. Advantageously, making the selection of appropriate wireless access area between scan intervals avoids increasing the duration of the next, upcoming scan interval that might otherwise result from performing the selection during the interval itself.

The procedure used by the AT to choose the particular wireless access area depends on the determination made at step 106. Specifically, if the determination is that the second plurality of wireless access areas is the same as the first plurality of wireless access areas, then at step 108 the AT selects the wireless access area that was the "target" of the handoff, namely the second wireless access area. If the determination is that the second plurality of wireless access areas is not the same as the first plurality of wireless access areas, then at step 108 the AT selects the particular wireless access area based upon signal strength detected on the second air interface from one or more of the second plurality of wireless access areas. Each of these alternatives is explained below.

The first wireless access area, which is the source of the handoff, and the second wireless access area, which is the target of the handoff, are both part of the first plurality of wireless access areas. Consequently, if the second plurality is the same as the first, then the operational conditions that led to the selection of the second wireless access area as the IS-856 handoff target should apply to the IS-2000 interface as well. Hence, the second wireless access area is selected for the next 1X-RTT idle-state scan if the first and second plurality of wireless access areas are the same.

If the two pluralities of wireless access areas are not the same, then the operational conditions that led to the selection of the second wireless access area as the IS-856 handoff target do not necessarily apply to the IS-2000 interface. In this case, the AT uses measured signal strengths on its second air interface to select the particular wireless access area. Specifically, under IS-2000 and IS-856 (and more generally, under a CDMA family of protocols), each wireless access area broadcasts a pilot signal for purposes of identification, timing, and handoff target selection (among others). In accordance with the example embodiment, the AT will measure the strength on its IS-2000 interface of the pilot signal from the sector used during the last (most recent) idle-state scan. If the strength is not below a first threshold strength, then the same (i.e., previous) sector will be deemed still sufficiently strong to be used on the next idle-state scan. Thus, the AT will select the most-recently-used sector as the particular wireless access area. If instead, the strength is below the first threshold strength, then AT will carry out a 1X-RTT idle-state handoff. Thus, the AT will search on its IS-2000 interface for a pilot signal that exceeds a second threshold level and select the associated sector as the particular wireless access area.

The access terminal will carry out both the first threshold test and the 1X-RTT idle-state handoff (if necessary) using just its low-gain antenna, while maintaining the EVDO session with its high-gain antenna. Advantageously, the AT will then accommodate uninterrupted EVDO communication on one interface at the same time that it uses the other to select the particular wireless access area for the next (upcoming) 1X-RTT idle-state scan. As will be described in more detail below, an access terminal typically employs a "rake" receiver that has multiple "fingers," each of which may be independently tuned to a different radio frequency. In addition to using the low-gain antenna on the IS-2000 interface, the AT will also use one of the rake fingers on the IS-2000 interface, while leaving the remaining fingers for reception on the IS-856 interface. This further helps facilitate uninterrupted EVDO communication.

Finally, at step 110, the particular wireless access area selected at step 108 is used during the next scan interval on the second air interface. In accordance with the example embodiment, the AT will scan on its IS-2000 interface for a 1X-RTT communication from the particular wireless access area (e.g., sector) during the next 1X-RTT idle-state scan. Since the particular wireless access area will have been selected prior to the start of the scan interval, the AT will not need to devote any time to determining an appropriate wireless access area for the scan. Advantageously, this will help minimize the duration of the scan.

It will be appreciated that the steps of FIG. 1 are illustrated by way of example, and that additional and/or alternative steps or alternative ordering of steps could be carried in order to achieve enhanced idle-state sector selection during hybrid-mode operation. Further details related to some of the steps shown in FIG. 1 are discussed below.

Figure 2:
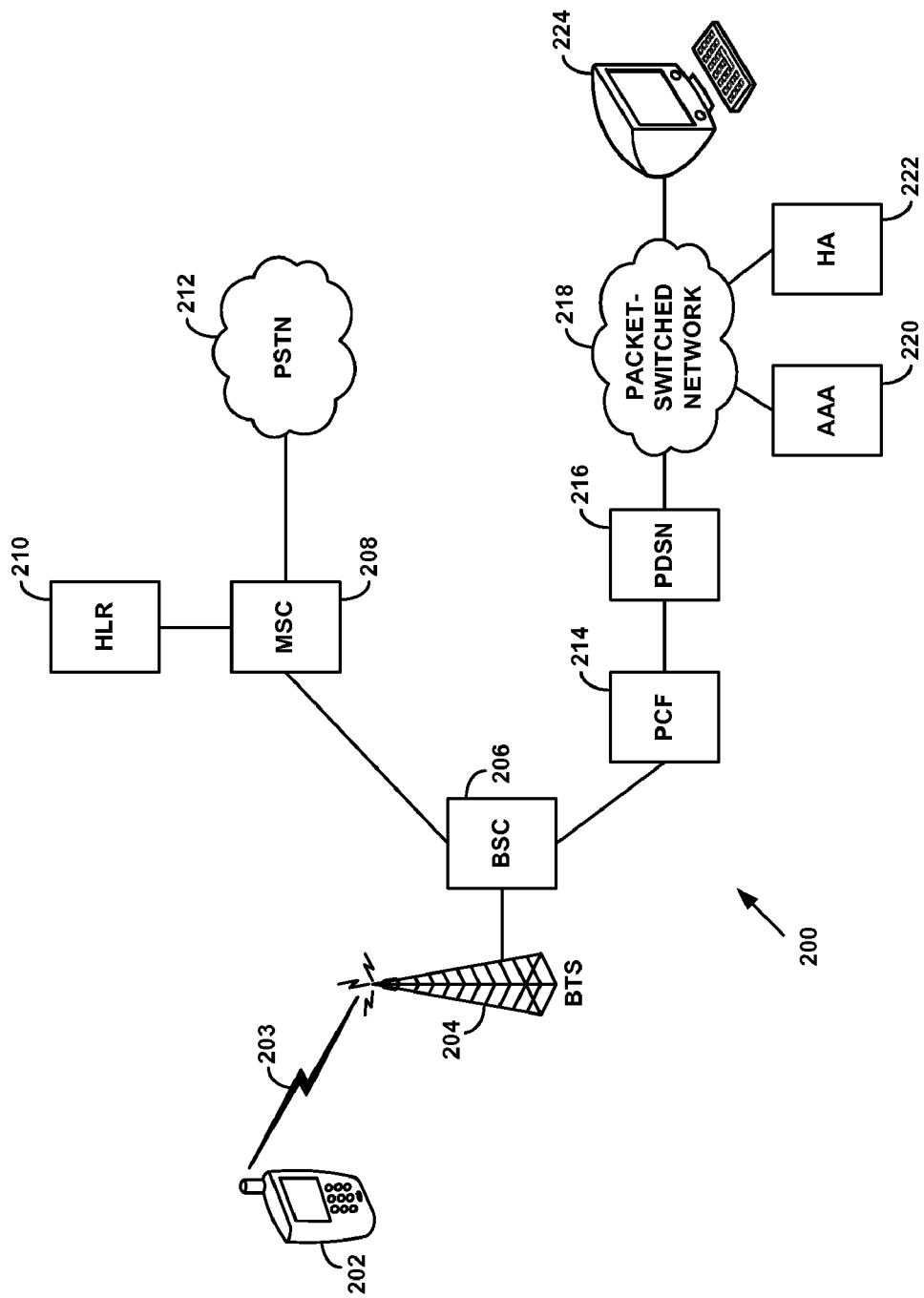
FIG. 2 is a simplified block diagram of a wireless communication system in which an example embodiment of enhanced idle-state sector selection during hybrid-mode operation could be carried out.

FIG. 2 shows a simplified block diagram of a wireless communication system 200 in which an exemplary embodiment of enhanced idle-state sector selection during hybrid-mode operation can be employed. Access terminal AT 202 communicates over an air interface 203 with a BTS 204, which is then coupled or integrated with a BSC 206. Transmissions over air interface 203 from BTS 204 to AT 202 represent the forward link to the access terminal, while transmissions over interface 203 from AT 202 to BTS 204 represent the reverse link.

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

An access terminal that has no active data session or voice call (i.e., no assigned traffic channel), but is otherwise operational in an IS-2000 system, is said to be in an "idle" state or mode. While in the idle state, the access terminal periodically scans the 1X interface for communication from the wireless communication system. More specifically, the AT monitors the paging channel for page messages from the base station. Page messages are used to send the access terminal information, alerts, and requests during times when the AT isn't engaged in any 1X-based communication (i.e., when the AT is idle). For instance, the AT is alerted of an incoming call via a page message.

In practice, a wireless communication system implements multiple paging channels (typically, up to seven), each subdivided into 2,048 periodically recurring, 80-millisecond (ms) slots. In order to help conserve AT battery power, an AT in the idle state monitors only certain assigned slots on a given paging channel. More specifically, an AT's assigned slots recur according to a "slot cycle" having a sub-period within the 2,048-slot "maximum slot cycle" period (163.84 seconds). The sub-period (slot cycle) is set according to a system parameter called the "slot cycle index." For instance, slot cycle index values of 0, 1, and 2 define slot cycles of 1.28, 2.56, and 5.12 seconds, respectively, corresponding to recurrence every 16, 32, and 64 slots per maximum slot cycle. Within the maximum slot cycle, the phase of an AT's slots is determined according to a "hashing function" that effectively randomizes the phases of all ATs such that, on average, no one slot is assigned to more ATs than any other slot.

An AT in the 1X-RTT idle state maintains only one sector at a time in its active set, and during each of an AT's slots, it will scan the 1X paging channel of this one active-set sector for any possible messages (pages). The AT does not update its active set prior to starting a scan, but rather begins a current scan by using the sector of the previous scan. If the AT then fails to be able to decode the 1X paging channel of this active-set sector, the AT initiates an "idle-state handoff." During an idle-state handoff, the AT measures pilot signals received on its 1X interface from various sectors, and selects the sector with the strongest pilot, according to PN offset. Thus, the AT also uses its slot cycles to update its active set as necessary. Since an idle-state handoff is triggered by failure to decode the 1X paging channel of the current active-set sector during a scan, the duration of the 1X-RTT idle-state scan can exceed the nominal 80 ms slot size, if account is taken of the time required to determine the need for an idle-state handoff and the time required for the handoff to be carried out (if needed).

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps. TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise EVDO control messages.

Under IS-856, an access terminal communicates with the network on just a "best" sector of its active set at any given time, and the process of handing off from one active set member to another is referred to as "virtual soft handoff." As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

3. Hybrid IS-2000/IS-856 Systems

Given the proliferation of legacy IS-2000 systems, IS-856 was designed to be backwards compatible and to facilitate "hybrid" operation. In this scenario, a hybrid access terminal that can operate on both IS-2000 and IS-856 networks is required. A typical hybrid AT, for instance, may be capable of receiving voice, short message service (SMS) messages, and dedicated channel data services on IS-2000 networks, as well as high-speed packet data service on IS-856 networks. Note that a hybrid system could support additional or alternative air interface protocols, in which case, a hybrid AT might also be capable of operation under these additional or alternative protocols.

In a hybrid system, IS-2000 and IS-856 coverage are provided on different carrier frequencies, each of which is 1.25 MHz in bandwidth for consistency with legacy operation.

Further, most IS-856 systems are provided as overlays on existing IS-2000 systems, such that a given BSC provides either IS-2000 coverage or both IS-2000 and IS-856 coverage, referred to as dual mode above. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. Hybrid sectors typically use the same PN offset for both EVDO and 1X-RTT communications.

By standard design, when a hybrid AT is operating in an IS-856 system, it will also periodically monitor the control channels in the IS-2000 system, in search of any incoming voice calls, SMS messages, or the like, and to monitor IS-2000 pilot signals. In particular, in the active EVDO mode, the hybrid AT will continue monitor the 1X paging channel during its assigned slot cycles, in accordance with explanation above.

Further, because IS-856 is typically provided as an overlay on an existing IS-2000 system, it is possible that a hybrid terminal may need to hand off from a hybrid sector (providing both 1X-RTT and EVDO coverage) to an 1X-RTT sector (providing no EVDO coverage), e.g., as it moves physically out of a hybrid sector and into an IS-2000 sector. To be able to facilitate such a handoff, when a hybrid terminal is operating in IS-856 it will simultaneously maintain an IS-2000 active set as described above. In particular, as the hybrid AT periodically tunes to the IS-2000 frequency, it will monitor the IS-2000 pilots, report the signal strengths to the RAN, and update its active set under instruction from the RAN. Thus, when the terminal seeks to hand off from EVDO to 1X-RTT, the terminal can readily switch over to operating on one or more of the sectors currently in its IS-2000 active set.

4. Enhanced Idle-State Sector Selection During Hybrid-Mode Operation a. Operating Principles As described above, in conventional EVDO operation in a hybrid IS-2000/IS-856 system, a hybrid AT will periodically scan the 1X interface according to its slot cycle for 1X-based communications (e.g., page messages). During an active EVDO communication (i.e., data session) an AT has its antenna and receiver tuned the RF frequency of the EVDO interface. However, in order to scan the 1X interface according to its assigned slots, the AT must periodically tune to the RF frequency of the 1X interface and tune away from the EVDO interface for the duration of the scan interval. These slot-cycle scans, commonly referred to as "tuneaway scans," can have an impact on quality and throughput of EVDO communications. For example, a slot cycle index of 2 corresponds to a tuneaway scan every 5.12 s, or a roughly 2-4% interruption of an EVDO communication in terms of time (assuming 80-160 ms scans).

In a hybrid AT that includes both a primary antenna and a secondary antenna, the impact of tuneaway scans can be partially mitigated by concurrently tuning each antenna to a different one of the interfaces. More specifically, an access terminal typically employs a "rake" receiver that incorporates multiple (usually four to six) "fingers," each of which is capable of independently introducing a very high-resolution time shift (e.g., less than one microsecond) in its signal processing, as well as independently tuning to the same or a different radio frequency than the other fingers. When all fingers are tuned to the same frequency, the independent time shifting allows a single transmitted signal that, owing to reflections, is received via multiple paths of disparate propagation delays to be reconstructed by the rake receiver as a single signal. In this mode of operation, the independent time shifting of the fingers compensates for the differing propagation path delays, so that the signals received by the fingers may be coherently added together. Since the so-called multipath problem applies to both 1X-RTT and EVDO communications, compensation by rake-finger time-shifting applies to communications on both interfaces.

When two or more fingers are tuned to different frequencies, different signals transmitted on different carrier frequencies may be concurrently received. In this mode of operation, one or more fingers may be tuned to the frequency of one air interface, while the other fingers are tuned to the frequency of the other air interface. In particular, during a tuneaway scan, one or more rake fingers may tune to the 1X-RTT interface while the other fingers remain tuned to the EVDO interface. Each interface will also employ a different one of the two antennas.

The capability of the rake receiver and both antennas to simultaneously receive signals at the same or different RF frequencies enables the AT to operate in Simultaneous Hybrid Dual Receive (SHDR) mode. In particular, an AT can engage in an active EVDO communication with both antennas in combination, benefiting from their combined gain, and can conduct tuneaway scans with just its secondary antenna while continuing its EVDO communication with its primary antenna. Thus, SHDR operation supports uninterrupted EVDO communications during tuneaway intervals, albeit at slightly reduced gain during those intervals.

As a hybrid AT with an active EVDO session moves about within and among sectors (or other forms of coverage areas), it may hand off from one sector to another, according to the virtual soft handoff process described above. Since a handoff is generally related to changing RF conditions, the occurrence of an EVDO handoff could indicate that a handoff between IS-2000 sectors is necessary and/or appropriate as well. However, in a 1X-RTT idle state, the AT will not recognize that an idle-state handoff is necessary until the start of the next tuneaway scan, as described above. Then, if the handoff is needed, the resultant duration of the tuneaway scan may increase beyond the 80 ms slot size, in order to accommodate the handoff procedure.

If, in addition, the received signal on the 1X interface becomes too weak for the low-gain antenna to reliably detect the 1X control channels (e.g., paging channel), the AT reverts to "legacy hybrid mode" in which both antennas are used for tuneaway scans. The result is more reliable detection of the 1X control channels, but at the cost of reintroducing interruption of EVDO communications. If, in addition, a 1X-RTT idle-state handoff is necessary, the interruption to the EVDO session will be even longer and the possible adverse impact greater than if no handoff is needed. Even if SHDR mode can be maintained, an increased duration of a tuneaway scan increases the amount of time that just one antenna is devoted to EVDO session.

Figure 3:
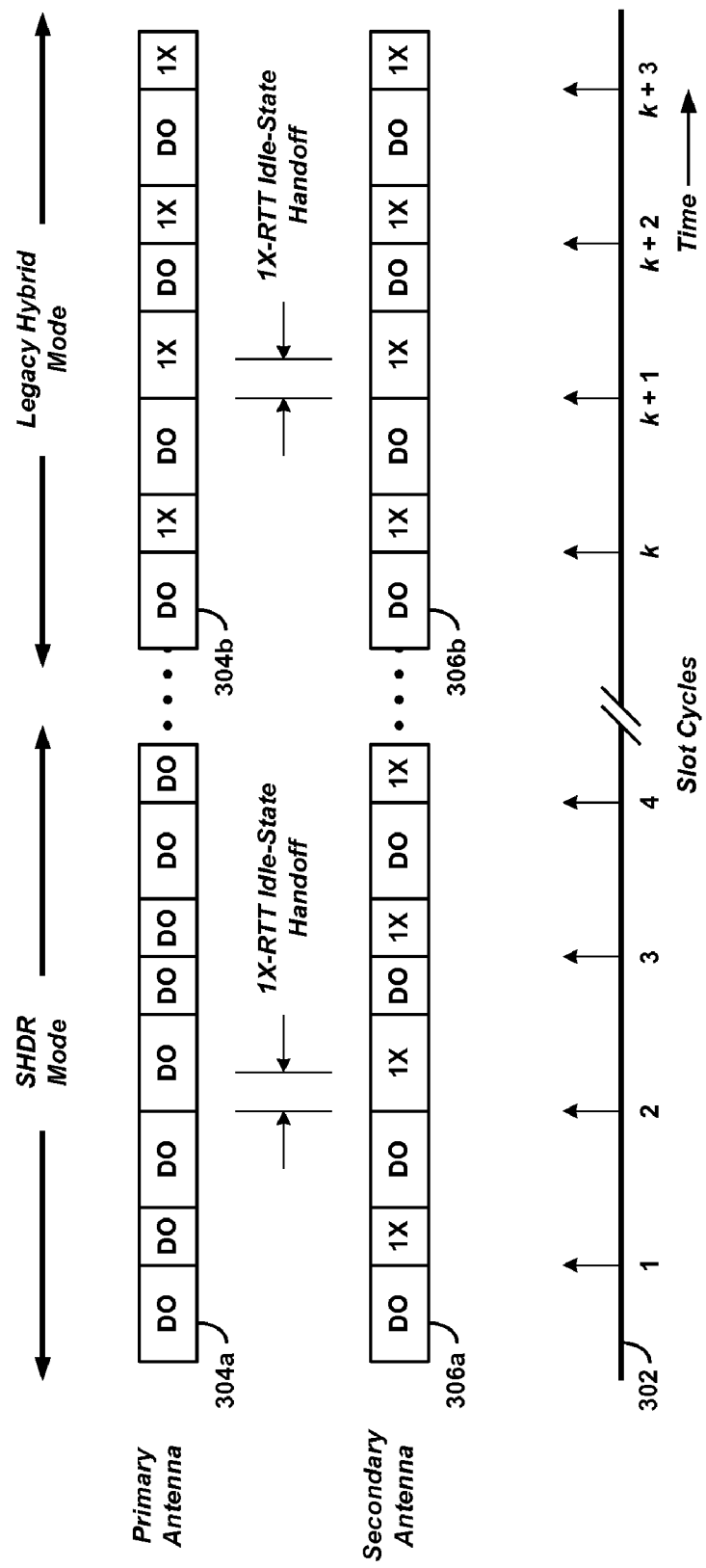
FIG. 3 illustrates the operating principles of SHDR operation and legacy hybrid mode.

The operational principles just described are illustrated schematically in FIG. 3 for a given access terminal. At the bottom of the figure, timeline 302 indicates the slot cycles for the given AT, the start time of each scan being marked by an upward arrow (with time increasing towards the right, as shown). Each time is labeled with a number for the purposes of the discussion herein. Hatch marks at the midpoint of timeline 302 indicate an (arbitrary) gap between slot cycle times (1, 2, 3, 4) and (k, k+1, k+2, k+3).

Operation across slot cycles of the primary (high-gain) and secondary (low-gain) antennas is depicted by antenna-receive sequences 304(a, b) and 306(a, b), respectively. By way of example, operation across slot cycle times 1, 2, 3, and 4 proceeds in SHDR mode, while across slot cycle times k, k+1, k+2, and k+3 operation proceeds in legacy hybrid mode. The gap in the timeline noted above could represent a time during which the 1X signal degraded to a level below which SHDR mode could no longer be maintained.

As indicated by antenna-receive sequence 304a, the primary antenna remains tuned to the DO interface continuously, even during the AT's assigned slot cycles. This is indicated by the continuous train of boxes labeled "DO" that make up sequence 304a. In contrast, antenna-receive sequence 306a shows that the secondary antenna tunes to the 1X interface (and away from the DO interface) during tuneaway scans. This is indicated by the boxes labeled "1X" that interrupt the "DO" boxes at each slot cycle in sequence 306a. Thus sequence 304a represents a continuous EVDO communication (i.e., data session) via the primary antenna, uninterrupted by tuneaway scans, while sequence 306a represents the same EVDO communication via the secondary antenna, but with periodic 1X tuneaway interruptions at slot-cycle times. Note that the relative durations of the DO and 1X intervals are not necessarily shown to scale; in particular, the 1X scans typically recur every 5.12 seconds and last on the order of 100 ms. However, in order to be able to distinguish the two types of intervals, the durations of the DO boxes and the 1X boxers are depicted as nearly the same size.

For purposes of illustration, the scan that begins at slot cycle time 2 is shown as requiring a 1X-RTT idle-state handoff, as indicated. Consequently, an initial duration (as marked between the two vertical lines and inward-pointing arrows) is devoted to a 1X-RTT idle-mode handoff, whereas the scan of the 1X paging and/or control channels doesn't begin until the handoff completes. As a result, the total duration of this tuneaway scan is evidently longer the scans beginning at slot cycle times 1, 3, and 4. Because this scan is carried out in SHDR mode, there is a corresponding time in sequence 304a during which only the primary antenna is being used for the EVDO session. Thus, the additional time spent during slot cycle 2 for the 1X-RTT idle-state handoff is additional time during which reduced sensitivity is available for the EVDO session.

The situation is more problematic for legacy hybrid mode. For purposes of illustration, a 1X-RTT idle-state handoff is shown as being required in the scan at slot cycle time k+1. In this case, the additional time spent for the 1X-RTT idle-state handoff is additional time during which the EVDO session is completely interrupted. In either case—SHDR mode or legacy hybrid mode—it would be advantageous to eliminate, or at least reduce, the incidence of 1X-RTT idle-state handoffs at the start of 1X-RTT idle-state scans.

Accordingly, embodiments of the present invention introduce enhanced idle-state sector selection during hybrid-mode operation of an access terminal. Specifically, a hybrid AT with an active EVDO session will select a sector for an upcoming tuneaway scan during a time interval between tuneaway scans. Since the conditions that trigger an EVDO handoff may indicate a change in conditions that also apply to the 1X-RTT interface, the AT will initiate a process for selecting a sector in response to an EVDO handoff during the time interval between scans. Advantageously, the process will reduce or eliminate the need to devote time during the tuneaway scan to a 1X-RTT idle-state handoff and/or to determining the necessity of such a handoff. As a result, the duration of tuneaway scans may be kept as short as possible. The process also operates so as to have minimal impact on the ongoing EVDO session.

b. Example Embodiment

Figure 4:
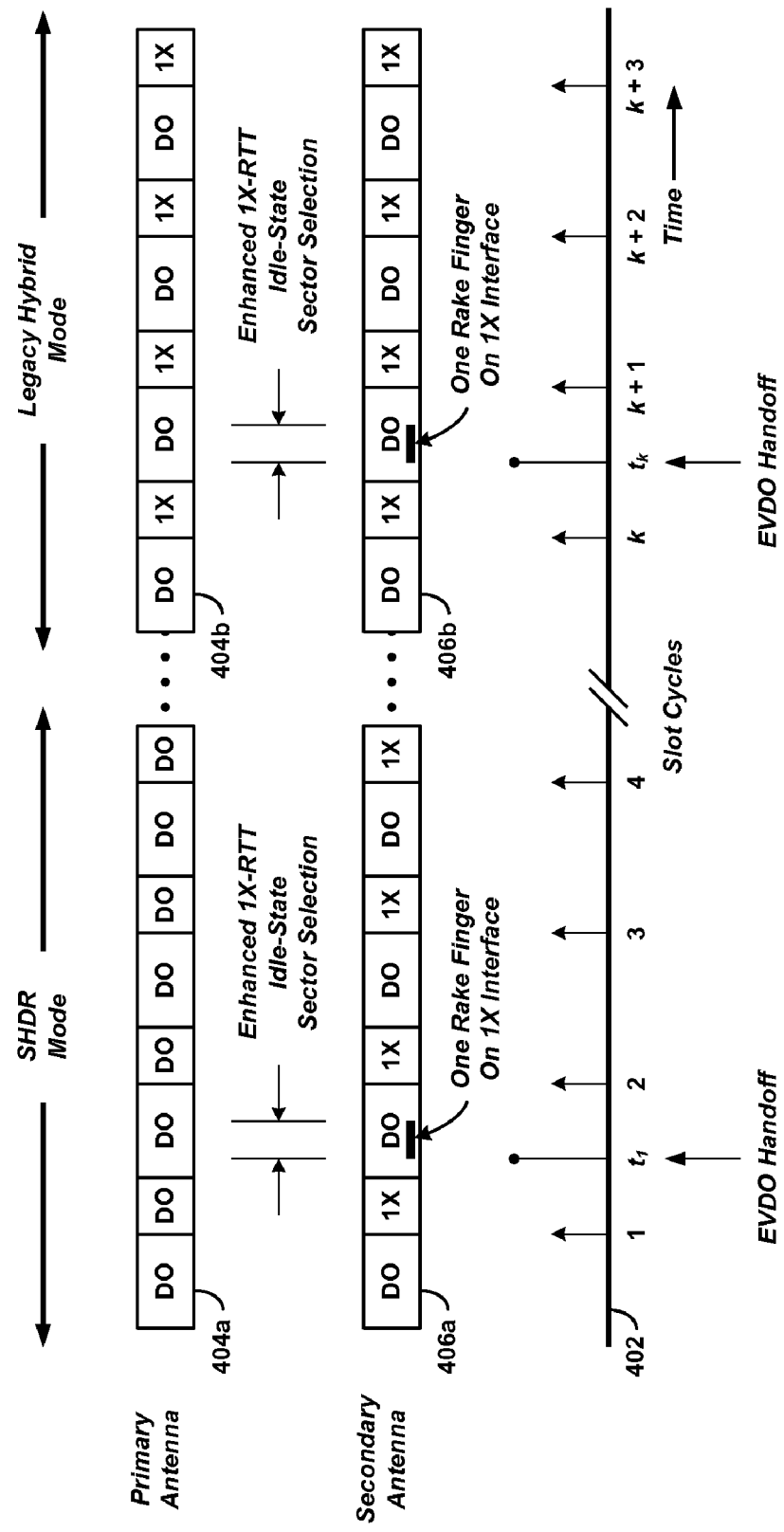
FIG. 4 illustrates the operating principles of enhanced idle-state sector selection during hybrid-mode operation.

The operating principles of enhanced idle-state sector selection during hybrid-mode operation are illustrated by way of example in FIG. 4, which, similarly to FIG. 3, includes timeline 402, and primary antenna-receive sequence 404(a, b) and secondary antenna-receive sequence 406 (a, b) for a hybrid AT. SHDR operation is shown in sequences 404a and 406a, while legacy hybrid mode is shown in sequences 404b and 406b. By way of example, an EVDO handoff is shown as occurring at time $t_1$, in the time interval between slot cycle times 1 and 2. Accordingly, the EVDO session is handed off from a first (source) EVDO sector to a second (target) EVDO sector. Responsive to the handoff, the AT carries out a procedure in which it selects a sector to use for the next, upcoming tuneaway scan (beginning at slot cycle time 2 in the present example). The procedure begins at $t_1$ and spans the time interval marked between the two vertical lines and inward-pointing arrows, labeled "Enhanced 1X-RTT Idle-State Sector Selection."

In accordance with an example embodiment, responsive to occurrence of an EVDO handoff, the AT first determines if it is operating within a region or sub-region where all of the EVDO sectors and all of the 1X-RTT sectors are the same. Specifically, the AT determines if there is a one-to-one correspondence between PN offsets for EVDO sectors and PN offsets for 1X-RTT sectors, in which case every EVDO sector is also a 1X-RTT sector, and vice versa. Under this condition, the AT selects the target sector of the EVDO handoff as the 1X-RTT sector for the upcoming tuneaway scan. This can be achieved by updating the AT's 1X-RTT active set to include the PN of the target sector of the EVDO handoff (which is also the PN of the 1X-RTT sector). The rationale for this selection is that, since all the EVDO and 1X-RTT sectors are the same, the conditions that triggered EVDO handoff will apply to the 1X-RTT interface. Hence, selecting the 1X-RTT sector on the basis of the EVDO handoff is likely at least as reliable as carrying out a 1X-RTT idle-state handoff.

If the AT determines that it is operating within a region or sub-region where the EVDO sectors and the 1X-RTT sectors are not all the same, then the AT checks if the current 1X-RTT active-set sector meets a signal-strength threshold. Specifically, the AT uses its low-gain antenna and at least one of its rake fingers tuned to the AT's 1X-RTT interface to measure the strength of the pilot signal from the current 1X-RTT active-set sector. If the measured strength is not below a first threshold level, then the current 1X-RTT sector is deemed still adequately strong for the upcoming tuneaway, and the active set is not updated. If instead the measured strength is below the first threshold level, then the AT initiates a 1X-RTT idle-state handoff. In this case, the 1X-RTT active set is updated to contain the sector selected for the next, upcoming tuneaway scan. Note that the updated 1X-RTT active set will not necessarily contain the same sector as the target of the EVDO handoff in this instance, since the AT is operating within a region or sub-region where the EVDO sectors and the 1X-RTT sectors are not all the same; this is explained further in the discussion below.

As with the first threshold test, idle-state handoff (if necessary) is performed using the low-gain antenna and the at least one rake finger tuned to the 1X-RTT interface. Advantageously, both the first threshold test and the idle-state handoff can thus be performed without interrupting the ongoing EVDO session. In FIG. 4, a thick, black, horizontal line labeled "One Rake Finger On 1X Interface" in the interval between slot cycle times 1 and 2 represents these aspects of the procedure. Note that this depiction in FIG. 4 only applies if the AT is operating within a region or sub-region where the EVDO sectors and the 1X-RTT sectors are not all the same.

In further accordance with the example embodiment, the sector selected in response to the occurrence of the EVDO handoff is used on the next tuneaway scan. This occurs in slot cycle time 2 in the present illustration, and as indicated in FIG. 4, this tuneaway scan is evidently no longer than any of the others (1, 3, or 4). Thus, selection of the 1X-RTT sector in the interval between tuneaway scans advantageously keeps the scan duration as short as possible, by mitigating the possible need for an idle-state handoff during the tuneaway scan.

The example embodiment also applies when the AT is operating in legacy hybrid mode. This is indicated in FIG. 4 by antenna-receive sequences 404b and 406b. As depicted in the figure, an EVDO handoff occurs at time $t_k$, between slot cycle times k and k+1. Responsive to the handoff, the same 1X-RTT sector selection procedure described above is initiated by the access terminal. The symbols and labels for legacy hybrid mode in the figure are the same as those for SHDR mode, explained above. As with SHDR mode, the selection of the 1X-RTT sector during the interval between tuneaway scans advantageously enables the next tuneaway scan (at slot cycle time k+1 in this illustration) to be as short as possible, again because the possible need for an idle-state handoff is eliminated. Also as with SHDR mode, the selection procedure is advantageously carried out without interrupting the ongoing EVDO session.

In accordance with the example embodiment, as described above, the AT either selects the target sector of the EVDO handoff or selects a 1X-RTT sector based on pilot signal strengths measured on its 1X-RTT interface, mode of selection depending whether or not the AT is operating in a region where the EVDO and 1X-RTT sectors are all the same. In view of the discussion above of hybrid IS-2000/IS-856 systems, a given sector will support both EVDO and 1X-RTT if the BTS of the sector is a hybrid BTS. Conversely, a given sector will support only 1X-RTT if the BTS of the sectors is not a hybrid BTS. (BTSs that support only EVDO are not common, and therefore not consider further herein. However, the present invention does not exclude embodiments comprising EVDO-only sectors.) In a region in which every BTSs is hybrid, every PN offset for an EVDO sector is also a PN offset for a 1X-RTT sector. In a region containing both hybrid BTSs and one or more 1X-RTT-only BTSs, at least one PN offset will be associated with a 1X-RTT-only sector.

Figure 5:
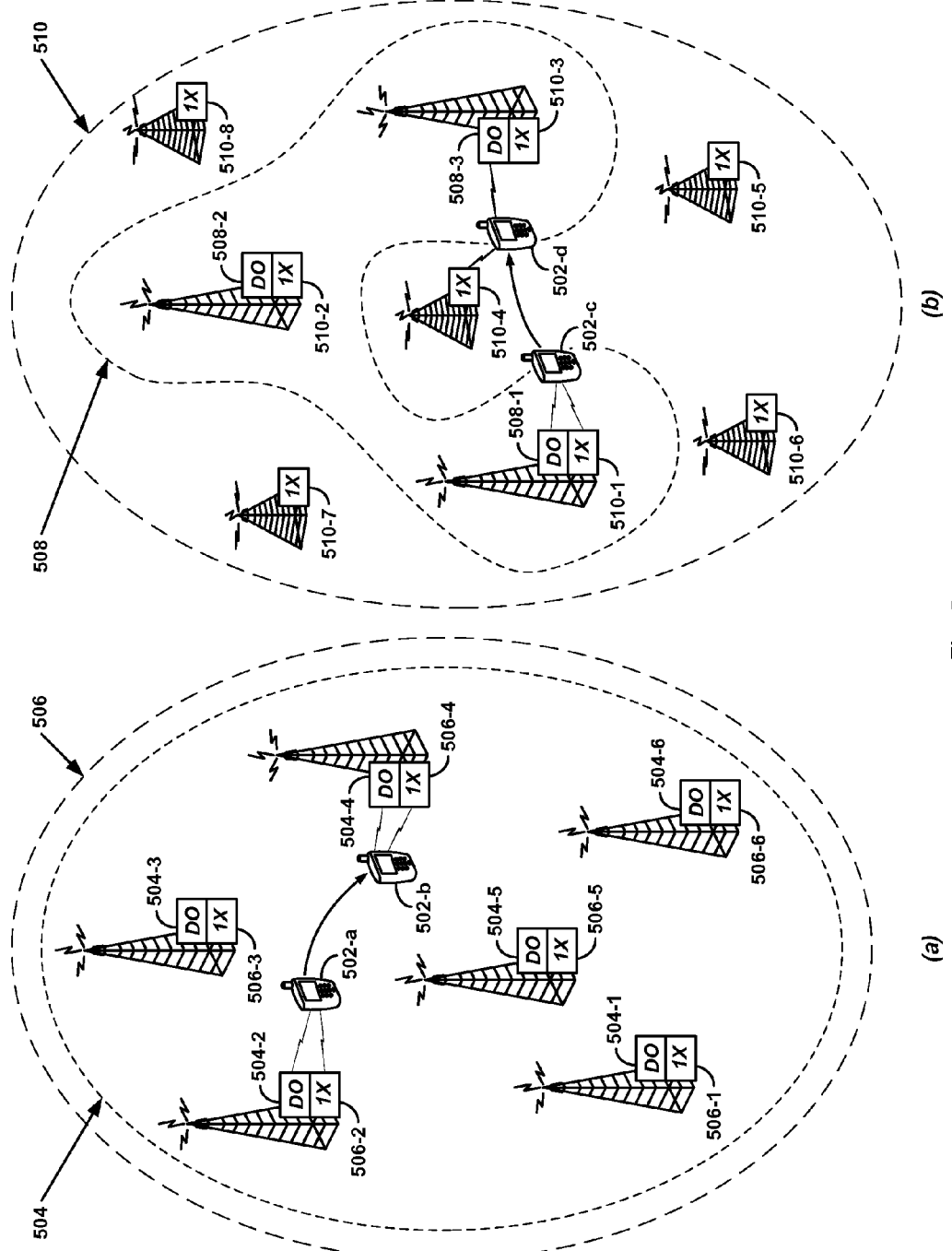
FIG. 5 illustrates two example arrangements of wireless coverage areas in a hybrid EVDO/1X-RTT network, and how an example hybrid access terminal operating in each may select a wireless coverage area for 1X-RTT idle-state scans during hybrid operation.

FIG. 5 illustrates the concepts of the different types of regions referred to above. In the figure, each sector (or more generally wireless access area) is represented by a cartoon of a radio tower with an attached box labeled "1X," "DO," or both depending on the air interface(s) it supports. Sectors that support only 1X-RTT are depicted with a short tower, while sectors that support both 1X-RTT and EVDO (hybrid sectors) are depicted with a tall tower. Note that the height of the towers in the figure is just a visual cue, and is not meant to signify any other characteristics of the sectors. Panel "(a)" on the left of the figure illustrates an example of an AT operating in a region or sub-region where all of the EVDO sectors and all of the 1X-RTT sectors are the same. Panel "(b)" on the right of the figure illustrates an example of an AT operating in a region or sub-region where the EVDO sectors and the 1X-RTT sectors are not all the same.

In panel (a), a short-dashed oval is shown to enclose a first plurality 504 of wireless access areas 504-1, 504-2, 504-3, 504-4, 504-5, and 504-6 that support at least EVDO. Panel (a) also shows a long-dashed oval that encloses a second plurality 506 of wireless access areas 506-1, 506-2, 506-3, 506-4, 506-5, and 506-6 that supports 1X-RTT. As depicted in panel (a), every wireless access area of both pluralities is a hybrid area that supports both protocols. Therefore, the first and second pluralities in panel (a) are the same (both ovals enclose the same wireless access areas), and each PN offset for an EVDO sector in the first plurality is also a PN offset for a 1X-RTT sector in the second plurality, and vice versa.

Panel (a) also shows an EVDO handoff of an AT 502 from an EVDO source to an EVDO target sector. Prior to the EVDO handoff, the AT (labeled 502-a) is engaged in an EVDO session with EVDO sector 504-2 and also uses 1X-RTT sector 506-2 for its idle-state scans (lightning-bolt shaped lines from the AT to the BTS represent these respective communications). As noted, sectors 504-2 and 506-2 share a common PN offset. After the handoff, the AT (now re-labeled 502-b) engages in the EVDO session with EVDO sector 504-4, while using 1X-RTT sector 506-4 for its idle-state scans. Since all the sectors are hybrid sectors, sectors 504-4 and 506-4 also share a common PN offset. The AT therefore selects 1X-RTT sector 506-4 as its new 1X-RTT active-set sector according to the PN offset that it shares with EVDO sector 504-4, making this selection in response to the EVDO handoff, and without testing or searching for any other alternative sector.

In panel (b), a short-dashed irregular curve encloses a first plurality 508 of wireless access areas 508-1, 508-2, and 508-3 that support at least EVDO. Panel (b) also shows a long-dashed oval that encloses a second plurality 510 of wireless access areas 510-1, 510-2, 510-3, 510-4, 510-5, 510-6, 510-7, and 510-8 that support 1X-RTT. In this case, the first plurality consists of hybrid sectors, while the second consists of all the sectors, including both hybrid sectors (510-1, 510-2, 510-3) and 1X-RTT-only sectors (510-4, 510-5, 510-6, 510-7, 510-8). (The mathematical union of the first and second pluralities encompasses all of the wireless access areas.) As such, EVDO sector 508-1 and 1X-RTT sector 510-1 share the same PN offset, as do EVDO sector 508-2 and 1X-RTT sector 510-2, and also EVDO sector 508-3 and 1X-RTT sector 510-3. However, 1X-RTT sectors 510-4, 510-5, 510-6, 510-7, and 510-8 do not share their respective PN offsets with any EVDO sectors. Therefore, the first and second pluralities are not the same.

An EVDO handoff of an AT 502 from an EVDO source to an EVDO target sector is also shown in panel (b). Prior to the EVDO handoff, the AT (labeled 502-*c*) is engaged in an EVDO session with EVDO sector 508-1 and also uses 1X-RTT sector 510-1 for its idle-state scans (again, lightning-bolt shaped lines from the AT to the BTS represent these respective communications). As indicated, the source sector is a hybrid sector, wherein 508-1 and 510-1 share a common PN offset. After the handoff, the AT (now re-labeled 502-*d*) engages in the EVDO session with EVDO sector 508-3, but uses 1X-RTT-only sector 510-4 for its idle-state scans. Sectors 508-3 and 510-4 are different sectors that do not share a common PN offset.

Since the first and second pluralities are not the same in this instance, the AT responds to the EVDO handoff by searching on its 1X-RTT interface for an updated 1X-RTT sector, in accordance with the description above. In the present illustration, the AT evidently determined that 1X-RTT sector 510-4 was the best choice, and therefore selected this sector for updating its 1X-RTT active set. For example, movement of the AT from EVDO sector 508-1 toward EVDO sector 508-3 could have triggered the EVDO handoff, but the AT might be closer to 1X-RTT sector 510-4 than to 1X-RTT sector 510-3 after the handoff. It will be appreciated that a different the 1X-RTT sector could selected, including the target of the EVDO handoff. In any event, the selection process, including possibly a 1X-RTT idle-state handoff, is carried out without interruption to the EVDO session.

In accordance with the example embodiment, the AT either defaults to the target of the EVDO handoff or initiates the selection process that could include an idle-state handoff based on a determination of which type of coverage region it is operating in. This determination could be made in a number of ways. In the simplest case, a wireless communication system might deploy only hybrid sectors, and access terminals could be configure to always default to the target of an EVDO handoff. Alternatively, a wireless communication system might comprise coverage regions that are well-defined with respect to the types of sector deployed, such that an AT could determine from its location or from a message from the RAN which type of region the AT is operating in. For example, the AT could be configured or provisioned with a table that correlates location (or some other region-specific attribute) with either hybrid-only or mixed hybrid-and-1X-RTT-only sectors. Such table could be stored in the AT's memory, and consulted when an EVDO handoff occurs. As a further alternative, the AT could receive occasional updates or directives from the RAN, informing the AT as to the type of coverage region it is currently operating in. It will be appreciated that other methods could be used by the AT to determine the type of coverage area it is operating in, and thus to determine whether or not the second plurality of wireless access areas (i.e., ones that support a second air interface, such as 1X-RTT) is the same as the first plurality of wireless access areas (i.e., ones that support a first air interface, such as EVDO).

In an alternative embodiment of the present invention, an access terminal might omit making the determination of which type of coverage area it is operating in, and effectively assume the area to be one characterized by two different pluralities. In this embodiment, the AT would always, in response to a handoff on its first air interface (e.g., EVDO), test the pilot signal strength on its second air interface (e.g., 1X-RTT), and perform an idle-state handoff if necessary. While this might result in extra actions not strictly required in a hybrid-only region, such an embodiment could be advantageous is situations where a region-type determination is difficult or impractical to make.

5. Implementation of Example Embodiment

The example embodiment of enhanced idle-state sector selection during hybrid-mode operation described above can be implemented as a method carried out on a hybrid access terminal or other communication device that operates according to IS-2000 and IS-856 in a similarly-compliant wireless communication system such as the one described above in connection with FIG. 2. The logical steps and operations of the method are described in the next subsection. Example means for carrying out the method are described in the subsequent subsection.

a. Example Method

Figure 6:
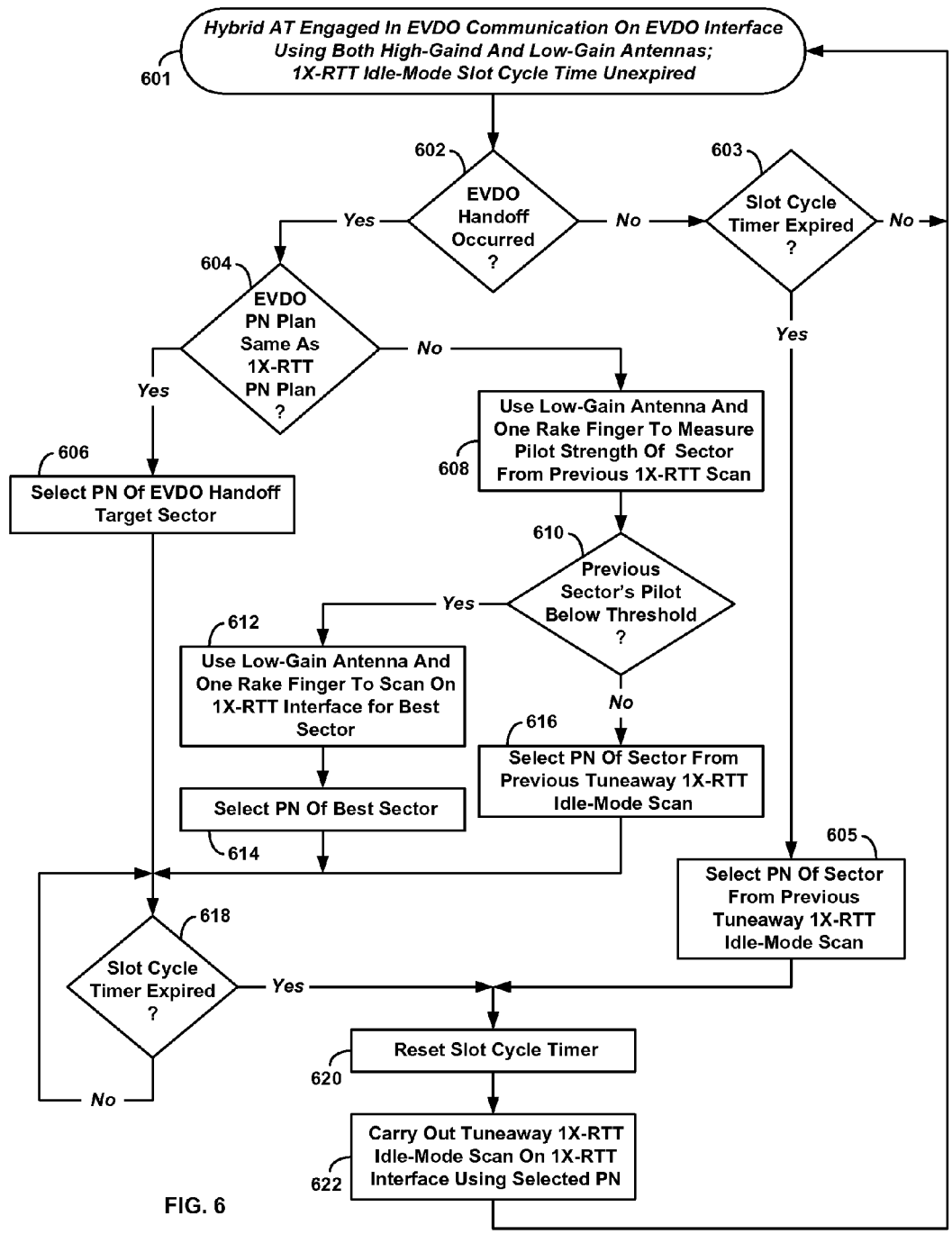
FIG. 6 is a flowchart depicting an example embodiment of the logical execution of enhanced idle-state sector selection during hybrid-mode operation in a device such as a hybrid access terminal.

FIG. 6 depicts enhanced idle-state sector selection during hybrid-mode operation in the form of a logical flowchart. The steps represented in the flowchart could be implemented in the form of computer software or firmware (or other form of machine-language instructions) stored in computer readable memory on a device such as a hybrid AT, and executed by one or more processors of the device. By way of example, the example method will be considered as being implemented on a hybrid access terminal.

As shown in FIG. 6, the hybrid AT is initially engaged in an EVDO communication (601). For instance, the AT may have an active data session established according to the description of IS-856 above in connection with FIG. 2. As indicated, the AT receives the EVDO communication on the EVDO interface with both its primary (high-gain) and secondary (low-gain) antennas in combination. By way of example, the AT maintains its slot cycles by way of a slot cycle timer, which upon expiration triggers the AT to initiate a tuneaway scan. At step 601, the slot cycle timer is has not yet expired, so this step corresponds to a time between 1X-RTT slot cycle scans.

Step 602 represents response of the AT to occurrence of an EVDO handoff, while step 603 represents the AT waiting for the slot cycle timer to expire. As long as no handoff occurs ("No" branch from step 602) and the timer has not yet expired ("No" branch from step 603), the AT continues operating as in initial step 601. It will be appreciated that while the logical loop 601-602-603-601 is depicted as including explicit tests (steps 602 and 603), the loop could actually represent the AT simply waiting for an event to occur, and then determining the nature of the event (e.g., an EVDO handoff or a time expiration).

Upon occurrence of an EVDO handoff ("Yes" branch from step 602), the AT determines at decision step 604 which type of coverage area it is operating in. As indicated, the first plurality is referred to the "EVDO PN Plan," and the second plurality is referred to as the "1X-RTT PN Plan." This terminology is reflective of the correspondence of sector (or other form of coverage area) with PN offset. Thus, if the EVDO PN plan is the same as the 1X-RTT PN plan, then every sector is a hybrid sector and the two pluralities are the same. Since hybrid sectors are generally deployed as EVDO overlays on 1X-RTT sectors, deployment of identical PN plans is sometimes referred to as a "one-to-one overlay."

If the PN plans are the same ("Yes" branch from step 604), then at step 606 the AT selects the PN of the EVDO handoff target sector as the PN of its 1X-RTT active-set sector. Thus, the selection of the sector to use on the next, upcoming tuneaway scan has been made prior to that next scan, and, advantageously, without interrupting the EVDO session. The AT then proceeds to step 618, where it waits for the slot cycle timer to expire (as represented by the "No" branch loop from step 618).

When the slot cycle timer expires ("Yes" branch from step 618), the AT resets the timer (step 620), and then carries out a tuneaway scan on its 1X-RTT interface, using the PN selected at step 606. Thus, the possible need for selecting the 1X-RTT sector as part of the tuneaway scan is advantageously eliminated, and the scan duration is kept as short as possible. Once the tuneaway scan is complete, the AT returns to its state in step 601, wherein it is still engages in the EVDO session and between tuneaway scans.

If the PN plans are not the same ("No" branch from step 604), the at step 608 the AT uses its low-gain antenna and one (or more) rake finger to measure the strength of the pilot signal of the sector used on the previous tuneaway scan. At step 610, the AT determines if the measured pilot signal strength is below a threshold. If it is below the threshold ("Yes" branch from step 610), the AT proceeds to steps 612 and 614, which together comprise a 1X-RTT idle-state handoff. As indicated at step 612, the procedure uses the low-gain antenna and one (or more) rake finger, thereby not interrupting the EVDO session. Once the 1X-RTT sector is selected for the next, upcoming tuneaway scan, the AT proceeds to step 618, where it waits for the slot cycle time to expire. The remaining steps are then the same as those described above following the "Yes" branch from step 618.

If the strength of the pilot signal of the sector used on the previous tuneaway scan is not below the threshold ("No" branch from step 610), then at step 616 AT selects the PN of the sector used on the previous scan to use again on the next, upcoming scan. In practice, the step 616 amounts to not updating the AT's 1X-RTT active set if the sector used on the previous tuneaway scan is deemed at step 610 to still be sufficiently strong to use on the upcoming scan.

From step 616, the AT proceeds to step 618, where it waits for the slot cycle time to expire. Again, the remaining steps are then the same as those described above following the "Yes" branch from step 618.

If the slot cycle timer expires without an EVDO handoff having occurred ("Yes" branch from step 603), the AT proceeds to step 605, where it selects the PN of the sector used on the previous tuneaway scan. This step is essentially the same as step 616, except that no EVDO handoff ever occurred, so the AT never considers selecting a 1X-RTT sector during the time between tuneaway scans. From step 605, the AT proceeds to step 618, where again it waits for the slot cycle time to expire. Once more, the remaining steps are then the same as those described above following the "Yes" branch from step 618.

It will be appreciated that flowchart in FIG. 6 depicts just one example of logical steps that may be used to carry out enhanced idle-state sector selection during hybrid-mode operation in a hybrid access terminal (or other similar device). It will be further appreciated that one or another of the steps could be modified, and that some steps could be carried out in a different order, while still achieving the described functionality of enhanced idle-state sector selection during hybrid-mode operation. For instance, the slot cycle timer could be reset after the tuneaway scan is complete. Moreover, the periodicity introduced by the timer could be implemented by some other means.

b. Example Access Terminal

Figure 7:
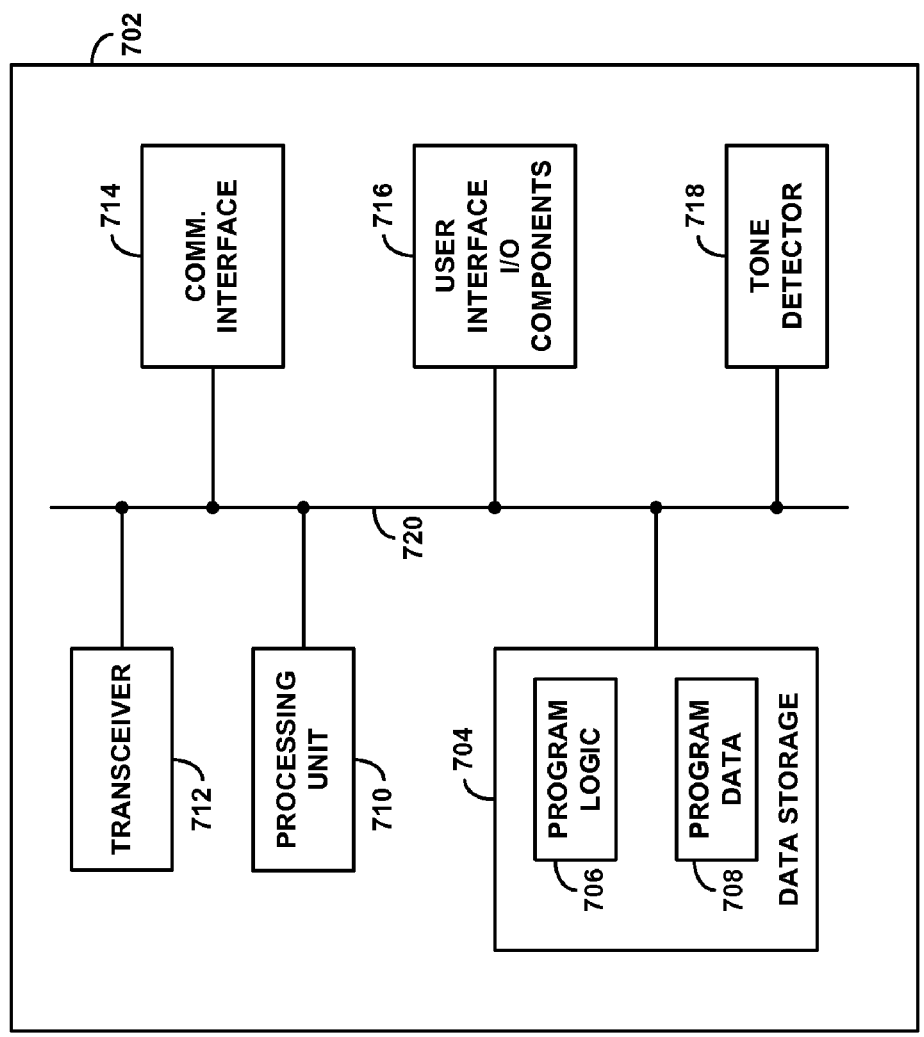
FIG. 7 is a block diagram of an example hybrid access terminal in which enhanced idle-state sector selection during hybrid-mode operation could be implemented.

FIG. 7 is a simplified block diagram depicting functional components of an example access terminal 602 in which enhanced idle-state sector selection during hybrid-mode operation may be implemented. The example AT 702 could be a cell phone, a personal digital assistant (PDA), a pager, a wired or wirelessly-equipped notebook computer, or any other sort of device capable of hybrid operation in a wireless communication system. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support SHDR mode operation and legacy hybrid mode operation and in a hybrid wireless communication network that is compliant with a CDMA family of protocols, such as network 200 illustrated in FIG. 2. The details of such an arrangement and how these components function to provide conventional operation are well-known in the art, and are not described further herein. Certain aspects of AT 702 relevant to enhanced idle-state sector selection during hybrid-mode operation are discussed briefly below.

Transceiver 712 preferably includes a high-gain (primary) antenna, a low-gain (secondary) antenna, a transmitter, and a rake receiver. In combination with communication interface 714, transceiver 712 enables communication with the network, including the ability to transmit and receive signals on both a 1X and a DO interface. In particular, signal reception on the 1X interface supports 1X tuneaway scans, in addition to other 1X-based communications. Transmission and reception on the DO interface supports EVDO communication.

Processing unit 710 comprises one or more general-purpose processors (e.g., INTEL microprocessors) and/or one or more special-purpose processors (e.g., dedicated digital signal processor, application specific integrated circuit, etc.). Although not shown, processor 710 or related components may also include timer functionality, such as that described in connection with the slot cycle timer in FIG. 6. In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise storage of machine language instructions that define routines executable by processing unit 710 to carry out various functions described herein. In particular the program logic, communication interface, and transceiver may operate cooperatively to carry out logical operation such as that discussed above and illustrated in FIG. 6. Further, program data 708 may be arranged to store the measured 1X-RTT signal level and the table listing the correspondence of coverage area types with location (or other attribute), as described above in connection the logical operation illustrated in FIG. 6.

It will be appreciated that there can be numerous specific implementations of enhanced idle-state sector selection during hybrid-mode operation in an access terminal, such AT 702 illustrated in FIG. 7. Further, one of skill in the art would understand how to devise and build such an implementation. As such, AT 702 is representative of means for carrying out enhanced idle-state sector selection during hybrid-mode operation in accordance with the methods and steps described herein by way of example.

6. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system, and having at least a first air interface that operates according to a first air interface protocol and a second air interface that operates according to a second air interface protocol, a method comprising:

engaging in a communication session on the first air interface via one or more wireless access areas that are among a first plurality of wireless access areas, including a first wireless access area and a second wireless access area;

during the communication session, engaging in periodic intervals of scanning on the second air interface for communication from one or more wireless access areas that are among a second plurality of wireless access areas;

making a determination of whether the second plurality of wireless access areas is the same as the first plurality of wireless access areas;

in a time interval between a previous periodic interval and a next periodic interval, responsive to an occurrence during the time interval of a handoff of the communication session from the first wireless access area to the second wireless access area, choosing a particular wireless access area by (i) if the determination is that the second plurality of wireless access areas is the same as the first plurality of wireless access areas, selecting the second wireless access area as the particular wireless access area, and (ii) if the determination is that the second plurality of wireless access areas is not the same as the first plurality of wireless access areas, selecting the particular wireless access area based on a respective signal strength detected on the second air interface from each of one or more of the second plurality of wireless access areas; and in the next periodic interval, scanning on the second air interface for communication from the particular wireless access area.

2. The method of claim 1, wherein the access terminal has at least a first antenna and a second antenna, wherein the first antenna has a higher gain than the second antenna, wherein engaging in the communication session on the first air interface comprises using both the first antenna and the second antenna in combination to engage in the communication session on the first air interface, and wherein engaging in periodic intervals of scanning on the second air interface for communication comprises engaging in periodic intervals of scanning on the second air interface for communication using one of (a) the first antenna, (b) the second antenna, or (c) both the first antenna and the second antenna in combination.

3. The method of claim 1, wherein the wireless communication system operates according to a CDMA family of protocols and includes a Radio Access Network (RAN), wherein the first air interface protocol is IS-856 and the second air interface protocol is IS-2000, wherein the access terminal is a hybrid access terminal, the communication session is an EVDO communication session, and the periodic intervals correspond to the access terminal's assigned 1X-RTT idle-state slot cycles, and wherein engaging in periodic intervals of scanning on the second air interface for communication comprises scanning on the second interface during 1X-RTT idle-state operation of the access terminal for a page message directed to the access terminal during one or more of the access terminal's assigned 1X-RTT idle-state slot cycles.

4. The method of claim 3, wherein each wireless access area of the first plurality and of the second plurality is one of a cell or a sector of the wireless communication system, wherein each wireless access area is associated with a PN offset, and wherein selecting the second wireless access area as the particular wireless access area comprises selecting a particular PN offset that is the same as a PN offset associated with the second wireless access area.

5. The method of claim 3, wherein during the previous periodic interval, the access terminal scanned on the second air interface for communication from a previous wireless access area, and wherein selecting the particular wireless access area based on the respective signal strength detected on the second air interface from each of one or more of the second plurality of wireless access areas comprises:

making a pilot-strength determination of whether a pilot signal from the previous wireless access area is measured on the second air interface at a strength that is below a first threshold;

if the pilot-strength determination is that the pilot signal from the previous wireless access area is measured on the second air interface at a strength that is not below the first threshold, selecting the previous wireless access area as the particular wireless access area; and if the pilot-strength determination is that the pilot signal from the previous wireless access area is measured on the second air interface at a strength that is below the first threshold, scanning on the second air interface for a given wireless access area from which a pilot signal is detected at a strength above a second threshold, and selecting the given wireless access area as the particular wireless access area.

6. The method of claim 5, wherein each wireless access area of the first plurality and of the second plurality is one of a cell or a sector of the wireless communication system, wherein each wireless access area is associated with a PN offset, wherein selecting the previous wireless access area as the particular wireless access area comprises selecting a particular PN offset that is the same as a PN offset associated with the previous wireless access area, and wherein selecting the given wireless access area as the particular wireless access area comprises selecting a particular PN offset that is the same as a PN offset associated with the given wireless access area.

7. The method of claim 5, wherein the access terminal has at least a high-gain antenna, a low-gain antenna, and a rake receiver, wherein making the pilot-strength determination comprises using the low-gain antenna and one or more fingers of the rake receiver to measure on the second air interface a strength of the pilot signal from the previous wireless access area, while using the high-gain antenna and one or more other fingers of the rake receiver to continue engaging in the communication session on the first air interface, and wherein scanning on the second air interface for a given wireless access area from which a pilot signal is detected at a strength above the second threshold comprises using the low-gain antenna and one or more fingers of the rake receiver to scan on the second air interface for a given wireless access area from which a pilot signal is detected at a strength above the second threshold, while using the high-gain antenna and one or more other fingers of the rake receiver to continue engaging in the communication session on the first air interface.

8. The method of claim 3, wherein each wireless access area of the first plurality and of the second plurality is one of a cell or a sector of the wireless communication system,
wherein each wireless access area is associated with a PN offset,
wherein choosing the particular wireless access area comprises selecting a particular PN offset,
and wherein scanning on the second air interface for communication from the particular wireless access area comprises scanning for communication on the second air interface from a wireless access area associated with the particular PN offset.

9. The method of claim 1, wherein making the determination of whether the second plurality of wireless access areas is the same as the first plurality of wireless access areas comprises receiving a message from the wireless communication system indicating that the second plurality of wireless access areas is the same as the first plurality of wireless access areas.

10. The method of claim 1, wherein making the determination of whether the second plurality of wireless access areas is the same as the first plurality of wireless access areas comprises determining whether the access terminal is operating within a geographic region where the wireless access areas of the second plurality are also the wireless access areas of the first plurality.

11. In an access terminal operating in a wireless communication system, and having at least a first air interface that operates according to a first air interface protocol and a second air interface that operates according to a second air interface protocol, a method comprising:
engaging in a communication session on the first air interface via one or more wireless access areas that are among a plurality of wireless access areas, including a first wireless access area and a second wireless access area;
during the communication session, engaging in periodic intervals of scanning on the second air interface for communication from one or more wireless access areas that are also among the plurality of wireless access areas;
in a time interval between a previous periodic interval and a next periodic interval, responsive to an occurrence during the time interval of a handoff of the communication session from the first wireless access area to the second wireless access area, selecting a particular wireless access area based on a respective signal strength detected on the second air interface from each of one or more of the plurality of wireless access areas; and
in the next periodic interval, scanning on the second air interface for communication from the particular wireless access area.

12. The method of claim 11, wherein the access terminal has at least a first antenna and a second antenna,
wherein the first antenna has a higher gain than the second antenna,
wherein engaging in the communication session on the first air interface comprises using both the first antenna and the second antenna in combination to engage in the communication session on the first air interface,
and wherein engaging in periodic intervals of scanning on the second air interface for communication comprises engaging in periodic intervals of scanning on the second air interface for communication using one of (a) the first antenna, (b) the second antenna, or (c) both the first antenna and the second antenna in combination.

13. The method of claim 11, wherein during the previous periodic interval, the access terminal scanned on the second air interface for communication from a previous wireless access area,
and wherein selecting a particular wireless access area based on a respective signal strength detected on the second air interface from each of one or more of the plurality of wireless access areas comprises:
making a pilot-strength determination of whether a pilot signal from the previous wireless access area is measured on the second air interface at a strength that is below a first threshold;
if the pilot-strength determination is that the pilot signal from the previous wireless access area is measured on the second air interface at a strength that is not below the first threshold, selecting the previous wireless access area as the particular wireless access area; and
if the pilot-strength determination is that the pilot signal from the previous wireless access area is measured on the second air interface at a strength that is below the first threshold, scanning on the second air interface for a given wireless access area from which a pilot signal is detected at a strength above a second threshold, and selecting the given wireless access area as the particular wireless access area.

14. The method of claim 13, wherein the access terminal has at least a high-gain antenna, a low-gain antenna, and a rake receiver,
wherein making the pilot-strength determination comprises using the low-gain antenna and one or more fingers of the rake receiver to measure on the second air interface a strength of the pilot signal from the previous wireless access area, while using the high-gain antenna and one or more other fingers of the rake receiver to continue engaging in the communication session on the first air interface,
and wherein scanning on the second air interface for a given wireless access area from which a pilot signal is detected at a strength above the second threshold comprises using the low-gain antenna and one or more fingers of the rake receiver to scan on the second air interface for a given wireless access area from which a pilot signal is detected at a strength above the second threshold, while using the high-gain antenna and one or more other fingers of the rake receiver to continue engaging in the communication session on the first air interface.

15. The method of claim 11, wherein each wireless access area of the plurality provides wireless access to access terminals according to both the first air interface protocol and the second air interface protocol,
and wherein selecting a particular wireless access area based on a respective signal strength detected on the second air interface from each of one or more of the plurality of wireless access areas comprises selecting the second wireless access area as the particular wireless access area.

16. The method of claim 11, wherein the wireless communication system operates according to a CDMA family of protocols and includes a Radio Access Network (RAN),
wherein the first air interface protocol is IS-856 and the second air interface protocol is IS-2000,
wherein the access terminal is a hybrid access terminal, the communication session is an EVDO communication session, and the periodic intervals correspond to the access terminal's assigned 1X-RTT idle-state slot cycles, and wherein engaging in periodic intervals of scanning on the second air interface for communication comprises scanning on the second interface during 1X-RTT idle-state operation of the access terminal for a page message directed to the access terminal during one or more of the access terminal's assigned 1X-RTT idle-state slot cycles.

17. The method of claim 16, wherein each wireless access area of the plurality is one of a cell or a sector of the wireless communication system, wherein each wireless access area of the plurality is associated with a PN offset, wherein selecting the particular wireless access area comprises selecting a particular PN offset, and wherein scanning on the second air interface for communication from the particular wireless access area comprises scanning for communication on the second air interface from a wireless access area associated with the particular PN offset.

18. In an access terminal operating in a wireless communication system, and having at least a first air interface that operates according to a first air interface protocol and a second air interface that operates according to a second air interface protocol, an improvement comprising:

means for engaging in a communication session on the first air interface via one or more wireless access areas that are among a plurality of wireless access areas, including a first wireless access area and a second wireless access area;

means for engaging, during the communication session, in periodic intervals of scanning on the second air interface for communication from one or more wireless access areas that are also among the plurality of wireless access areas;

means for selecting, in a time interval between a previous periodic interval and a next periodic interval, and responsive to an occurrence during the time interval of a handoff of the communication session from the first wireless access area to the second wireless access area, a particular wireless access area based on a respective signal strength detected on the second air interface from each of one or more of the plurality of wireless access areas; and means for scanning, in the next periodic interval, on the second air interface for communication from the particular wireless access area.

19. The improvement of claim 18, wherein the access terminal has at least a first antenna and a second antenna, wherein the first antenna has a higher gain than the second antenna, wherein means for engaging in the communication session on the first air interface comprise means for using both the first antenna and the second antenna in combination to engage in the communication session on the first air interface, and wherein means for engaging in periodic intervals of scanning on the second air interface for communication comprise means for engaging in periodic intervals of scanning on the second air interface for communication using one of (a) the first antenna, (b) the second antenna, or (c) both the first antenna and the second antenna in combination.

20. The improvement of claim 18, wherein during the previous periodic interval, the access terminal scanned on the second air interface for communication from a previous wireless access area, and wherein means for selecting a particular wireless access area based on a respective signal strength detected on the second air interface from each of one or more of the plurality of wireless access areas comprise:

means for making a pilot-strength determination of whether a pilot signal from the previous wireless access area is measured on the second air interface at a strength that is below a first threshold;

means for selecting the previous wireless access area as the particular wireless access area;

means for scanning on the second air interface for a given wireless access area from which a pilot signal is detected at a strength above a second threshold; and means for selecting the given wireless access area as the particular wireless access area.

21. The improvement of claim 20, wherein the access terminal has at least a high-gain antenna, a low-gain antenna, and a rake receiver, wherein means making the pilot-strength determination comprise means for using the low-gain antenna and one or more fingers of the rake receiver to measure on the second air interface a strength of the pilot signal from the previous wireless access area, while using the high-gain antenna and one or more other fingers of the rake receiver to continue engaging in the communication session on the first air interface, and wherein means for scanning on the second air interface for a given wireless access area from which a pilot signal is detected at a strength above the second threshold comprise means for using the low-gain antenna and one or more fingers of the rake receiver to scan on the second air interface for a given wireless access area from which a pilot signal is detected at a strength above the second threshold, while using the high-gain antenna and one or more other fingers of the rake receiver to continue engaging in the communication session on the first air interface.

22. The improvement of claim 18, wherein each wireless access area of the plurality provides wireless access to access terminals according to both the first air interface protocol and the second air interface protocol, and wherein means for selecting a particular wireless access area based on a respective signal strength detected on the second air interface from each of one or more of the plurality of wireless access areas comprise means for selecting the second wireless access area as the particular wireless access area.

23. The improvement of claim 18, wherein the wireless communication system operates according to a CDMA family of protocols and includes a Radio Access Network (RAN), wherein the first air interface protocol is IS-856 and the second air interface protocol is IS-2000, wherein the access terminal is a hybrid access terminal, the communication session is an EVDO communication session, and the periodic intervals correspond to the access terminal's assigned 1X-RTT idle-state slot cycles, and wherein means for engaging in periodic intervals of scanning on the second air interface for communication comprise means for scanning on the second interface during 1X-RTT idle-state operation of the access terminal for a page message directed to the access terminal during one or more of the access terminal's assigned 1X-RTT idle-state slot cycles.

24. The improvement of claim 23, wherein each wireless access area of the plurality is one of a cell or a sector of the wireless communication system,
  wherein each wireless access area of the plurality is associated with a PN offset,
  wherein means for selecting the particular wireless access area comprise means for selecting a particular PN offset, and wherein means for scanning on the second air interface for communication from the particular wireless access area comprise means for scanning for communication on the second air interface from a wireless access area associated with the particular PN offset.

* * * * *